(12) United States Patent
Carter et al.

(10) Patent No.: US 8,903,398 B2
(45) Date of Patent: Dec. 2, 2014

(54) SYSTEMS AND METHODS FOR PROVIDING A CONTENT PROXY IN A WIRELESS NETWORK

(75) Inventors: Gary Carter, Kanata (CA); Bastian Stassen, Ottawa (CA); Fred Godard, Ottawa (CA); Del Lippert, Cobden (CA); Chris Reinkeluers, Lombardy (CA)

(73) Assignee: International Datacasting Corporation, Kanata (CA)

( * ) Notice: Subject to any disclaimer, the term of this patent is extended or adjusted under 35 U.S.C. 154(b) by 63 days.

(21) Appl. No.: 13/440,009

(22) Filed: Apr. 5, 2012

(65) Prior Publication Data
US 2012/0258708 A1 Oct. 11, 2012

Related U.S. Application Data

(60) Provisional application No. 61/472,902, filed on Apr. 7, 2011.

(51) Int. Cl.
*H04W 36/00* (2009.01)
*H04W 76/00* (2009.01)
*H04W 36/08* (2009.01)
*H04W 88/18* (2009.01)

(52) U.S. Cl.
CPC ............ *H04W 76/002* (2013.01); *H04W 36/08* (2013.01); *H04W 88/182* (2013.01)

USPC ............ 455/436; 455/437; 455/438; 725/62; 725/73; 725/74; 725/82

(58) Field of Classification Search
None
See application file for complete search history.

(56) References Cited

U.S. PATENT DOCUMENTS

| 5,594,490 | A | * | 1/1997 | Dawson et al. | 725/67 |
| 5,722,074 | A | * | 2/1998 | Muszynski | 455/442 |
| 7,277,733 | B2 | * | 10/2007 | Ko et al. | 455/566 |
| 7,346,047 | B1 | * | 3/2008 | Berg et al. | 370/352 |
| 2008/0153460 | A1 | * | 6/2008 | Chan et al. | 455/412.1 |
| 2009/0005020 | A1 | * | 1/2009 | McGowan et al. | 455/414.3 |
| 2009/0240787 | A1 | * | 9/2009 | Denny | 709/219 |
| 2009/0327959 | A1 | * | 12/2009 | Lagardere et al. | 715/810 |
| 2010/0008290 | A1 | | 1/2010 | Fischer | |
| 2010/0034089 | A1 | | 2/2010 | Kovvali et al. | |
| 2010/0323682 | A1 | * | 12/2010 | Hatayama et al. | 455/422.1 |
| 2012/0131333 | A1 | * | 5/2012 | Zhang et al. | 713/156 |

* cited by examiner

*Primary Examiner* — Magdi Elhag
(74) *Attorney, Agent, or Firm* — Crowell & Moring LLP

(57) ABSTRACT

Systems and methods for providing a content proxy in a wireless network. A set of media is provided to an edge proxy server located at a wireless site using satellite communications and stored by the edge proxy server independent of a local mobile station request for media in the set of media. Mobile stations can access live streams of media selected from the set of media by wireless communications with a wireless node and as mobile station move from one wireless site to another, the live media stream can be provided uninterrupted to the mobile station.

18 Claims, 4 Drawing Sheets

SYSTEMS AND METHODS FOR PROVIDING A CONTENT PROXY IN A WIRELESS NETWORK

CROSS-REFERENCE TO RELATED APPLICATIONS

This application claims the benefit of U.S. Provisional Application No. 61/472,902, filed Apr. 7, 2011, the entire contents of which are herein expressly incorporated by reference.

BACKGROUND OF THE INVENTION

Mobile stations, such as mobile telephones, smart phones, laptop computers, tablet computers and the like are increasingly being utilized to access large files and high bit rate streaming multimedia content such as computer files, video and audio. This content requires much more data than a traditional telephone voice call. Although the ability to handle this increased capacity demand continues to be met at the air interface side of the network (i.e., between a wireless site and a mobile station), the networks for delivering this information to the wireless sites will likely not be able to achieve the required capacity to meet these demands without substantial, and possibly cost-prohibitive, capital outlays.

FIG. 1 is a block diagram of a conventional wireless system. In order to provide content to mobile stations, a plurality of content providers (CPs) 101a-101g provides media content to one or more content aggregators (CAGs) 103a, 103b. When mobile station 111 requests particular content, the request is sent to wireless site antenna 110a of wireless node 112a. The request is then passed through network gateway 115, terrestrial network 112 (e.g., a backhaul network) until it reaches the appropriate content aggregator that stores the requested content. The requested content is then retrieved and provided along the reverse path through the terrestrial network 112, network gateway 115, wireless node 112a and wireless antenna 110a until the content reaches mobile station 111.

As illustrated in FIG. 1, more than one wireless site will be coupled to CAGs 103a, 103b through terrestrial network 112. In practice, hundreds of thousands of wireless sites may be connected in this manner. Each wireless site can support a number of users, and accordingly at any given time there could be hundreds of thousands of streams of content passing through the terrestrial network. This is particularly problematic because terrestrial networks supporting wireless sites were originally dimensioned to support low-bit rate voice traffic. Increasing these terrestrial networks to accommodate the high capacity requirements to support the content requests of a large number of mobile stations may be prohibitively expensive.

A conventional technique to minimize the network capacity issues involved user request driven storage strategies, such as caching and predictive caching of data at the wireless nodes. Such techniques analyzed user requests to determine the data that should be cached. These methods are not capable of significantly reducing the network load in order to resolve the problems created by the demand for large files and high speed media distribution. Additionally, because these techniques cache data based on user requests, the first time a particular user requests data it would have to be obtained through the terrestrial network, thus incurring a delay before the data could be provided to the user.

SUMMARY OF THE INVENTION

Exemplary embodiments of the present invention eliminate the need for the major upgrades of the terrestrial network by removing the content traffic from the terrestrial network and utilizing a satellite network to deliver content to a series of edge proxy servers located at the edge of a wireless network. Specifically, the satellite network can deliver both file-based content and live real-time media streams (e.g., video and audio), to edge proxy servers located at the same wireless site as wireless network nodes.

Storage of the file-based content in the edge proxy servers produces a different traffic model and network functionality compared to conventional user request driven caching and predictive caching solutions because the file-based content is staged at the edge of the wireless network (i.e., at each wireless site) without requiring an initial user request for the content. Accordingly, the operator of the wireless network can control the timing of the transfer of the content to the wireless sites, whereas conventional user request driven caching and predictive caching solutions transfer data based on user demand, which can be quite unpredictable. Moreover, by employing the satellite delivery techniques of the present invention, a large amount of content can be transferred to each wireless site even when there is a high capacity demand on the terrestrial network due to, for example, a large amount of voice traffic.

Conventional predictive caching was typically performed on a per-wireless site basis. Thus, to accommodate user mobility these conventional techniques would then have required the transfer of the data from one wireless site to another or from the original data source during handoff. In contrast, using the edge proxy server solution of the present invention, all content is available at all wireless nodes within a particular geographic area independent of a user request.

An exemplary method involves storing, by a wireless site, a set of media, which includes a plurality of individual media, in a local edge proxy server independent of a local user request for any of the plurality of individual media in the set of media; receiving, by the wireless site, a request for a live stream of media from a mobile station; accessing, by the wireless site, the requested media from the set of media stored in the local edge proxy server; transmitting, by the wireless site, the live stream of media to the mobile station; receiving, by the wireless site, a handoff indication for the mobile station; identifying, by the wireless site, a current position of the live media stream; transferring, by the wireless site, an indication of the current position of the live media stream; and terminating, by the wireless site, transmission of the live media stream to the mobile station.

An exemplary apparatus comprises a satellite antenna; a satellite receiver coupled to the satellite antenna; and a local edge proxy server coupled to the satellite receiver and to a wireless node, wherein the local edge proxy server includes a processor and memory, the memory storing a set of media, which includes a plurality of individual media, received via the satellite antenna and the satellite receiver, wherein the local edge proxy server stores the set of media independent of a local user request for any of the plurality of individual media in the set of media, provides a live media stream from the set of media to a mobile station, determines a current position of the live media stream in response to a handoff indication and transfers an indication of the current position of the live media stream, wherein the local edge server proxy is located at a wireless site of the wireless node.

An exemplary non-transitory computer-readable medium stores instructions, which when executed, cause equipment at a wireless site to store a set of media, which includes a plurality of individual media, in a local edge proxy server independent of a local user request for any of the plurality of individual media in the set of media, receive a request for a live stream of media from a mobile station; access the requested media from the set of media stored in the local edge proxy server; transmit the live stream of media to the mobile station; receive a handoff indication for the mobile station; identify a current position of the live media stream; transfer an indication of the current position of the live media stream; and terminate transmission of the live media stream to the mobile station.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
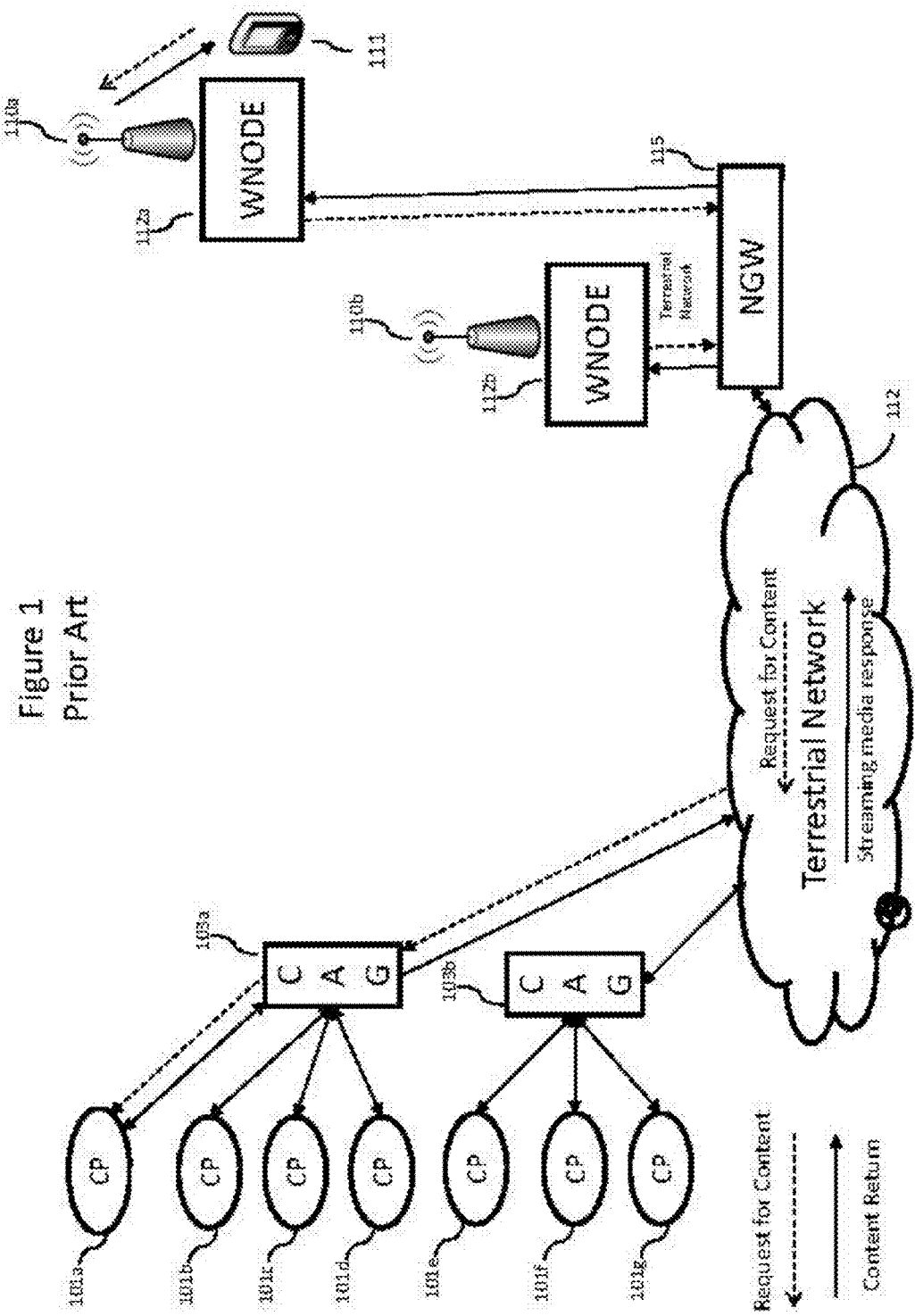
FIG. 1 is a block diagram of a conventional wireless system.
Figure 2:
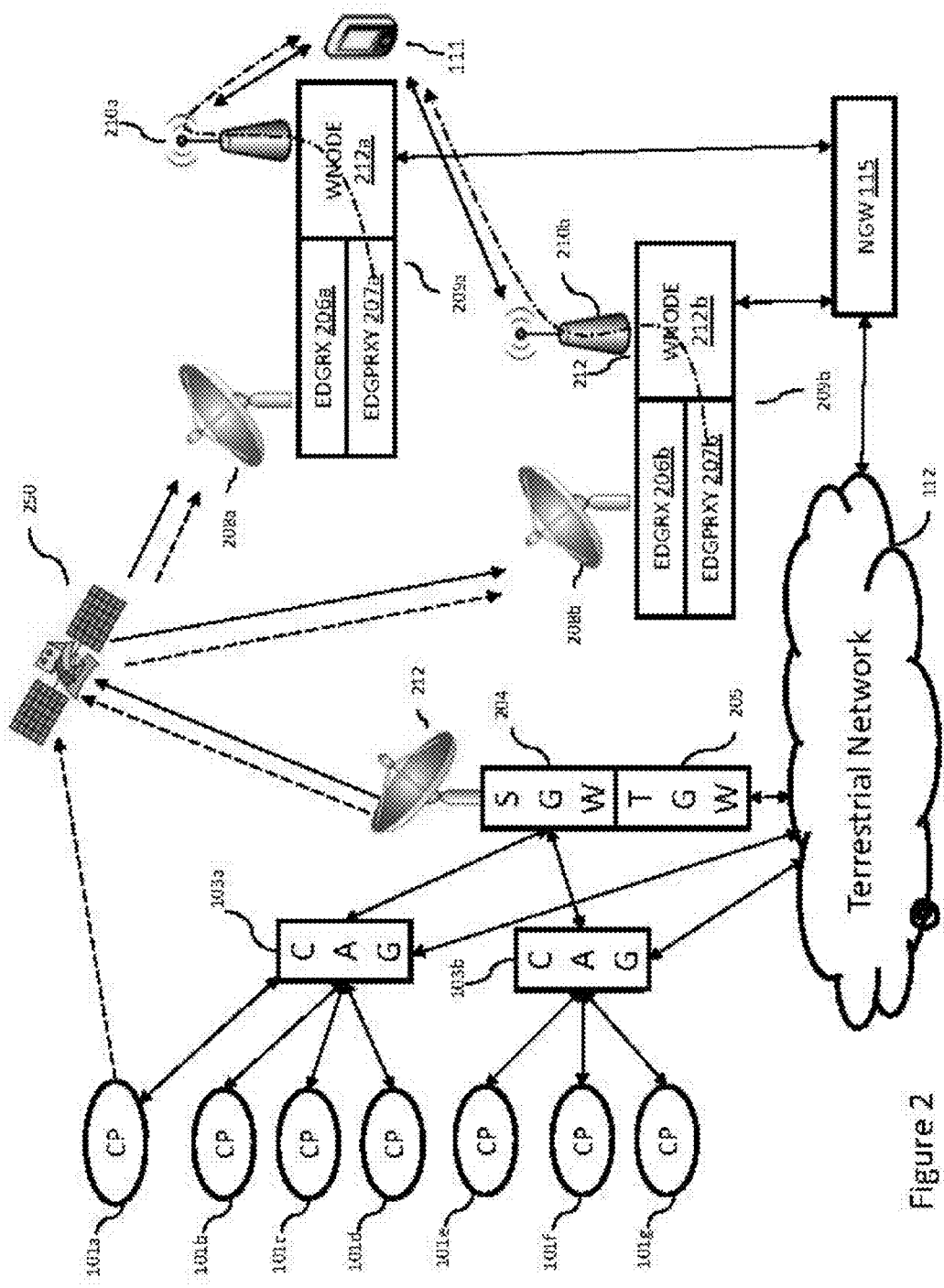
FIG. 2 is a block diagram illustrating an exemplary system in accordance with the present invention.

FIG. 2 is a block diagram of an exemplary system in accordance with the present invention. As illustrated in FIG. 2, exemplary embodiments of the present invention add an edge proxy server 207a, 207b to each wireless site 209a, 209b, and thus the edge proxy server 207a, 207b can be considered as a local proxy server at each wireless site 209a, 209b. Accordingly, as used herein the terms edge proxy server, local proxy server and local edge proxy server should be understood as referring to the same thing and are used interchangeably. Wireless sites 209a, 209b can be any type of wireless site, such as a wireless router or switch providing a wireless local area network, a wireless base station providing a wireless wide area network (e.g., a conventional wireless cell), etc. Additionally, the wireless sites can employ any type of communication protocol, including, but not limited to, WiMAX, EDGE, GPRS, Long Term Evolution (LTE), 1xRTT, any of the 802.11 protocols, etc. As will be described in more detail below, the edge receiver 206a, 206b receives file-based media content via satellite transmissions and stores a large volume of the file-based media content in the edge proxy server 207a, 207b so that content requests are served directly from the local wireless sites instead of traversing terrestrial network 112 for each request. The file-based media content is stored independent of a local user request (i.e., a request from a mobile station supported by the wireless site) for media in the set of media. This is achieved by providing a satellite gateway 204 coupled to each content aggregator 103a, 103b and to satellite 250. Thus, media content is eliminated from the terrestrial network, which frees-up capacity for voice calls and eliminates the need for significant increases in the capacity of the terrestrial network infrastructure. The terrestrial network can be any type of network, including a private network and/or the internet. Additionally, although not illustrated, the terrestrial network couples wireless nodes 212a, 212b to a wireless network operator's core network to support voice and/or data communication in a conventional manner.

Figure 3:
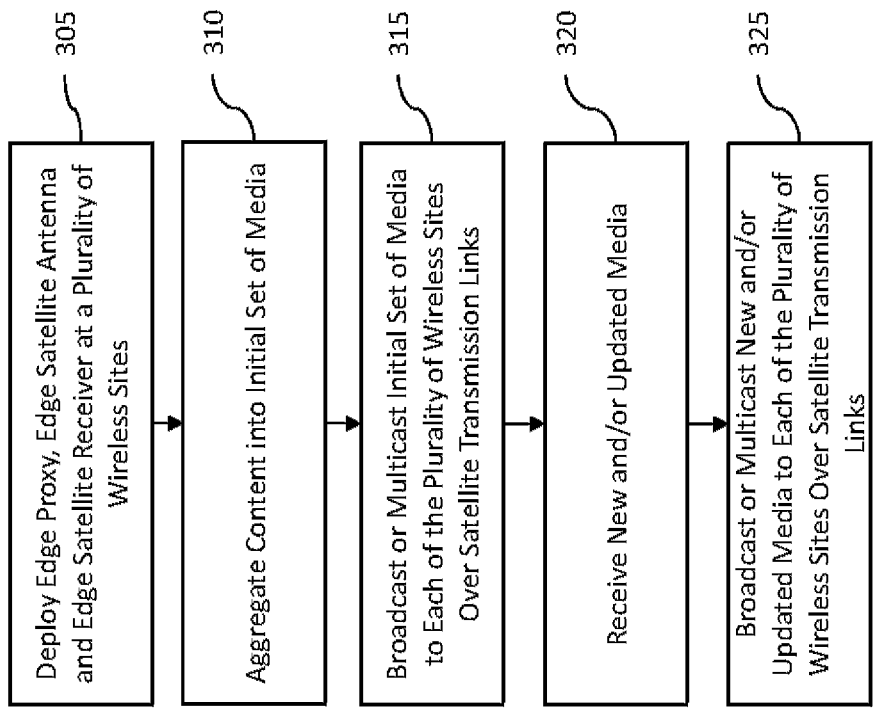
FIG. 3 is a flow chart illustrating an exemplary method in accordance with the present invention.

The operation of the system of FIG. 2 will now be described in connection with the flow charts of FIGS. 3 and 4. Initially, an edge proxy server 207a, 207b, edge satellite antenna 208a, 208b and a multi-channel edge proxy receiver 206a, 206b are deployed at each of a plurality of wireless sites 209a, 209b (step 305). After deployment, content aggregators 103a, 103b aggregate media from one or more content providers 101a-101g to form an initial, secure set of media (step 310). The media can be individually secured and/or secured as a package using any technique, including encryption and/or any type of digital rights management. The content aggregators 103a, 103b provide the initial, secure set of aggregated media to satellite gateway 204, which then transmits the content to one or more satellites 250 via satellite antenna 212. The one or more satellites 250 securely broadcast or multicast the initial set of content (step 315), which is received by wireless site satellite antennas 208a, 208b, passed to edge proxy receivers 206a, 206b, and then provided to edge proxy servers 207a, 207b where the content is locally stored at the wireless site 209a, 209b.

New or updated media can be provided either directly from a content provider 101a-101g to satellite 250 or via satellite gateway 204 and the new or updated content is then broadcast or multicast to each of the plurality of wireless sites via satellite transmission links in a similar manner to that described above (steps 320 and 325). New or updated media may be provided directly from a content provider 101a-101g using existing satellite services or channels, which may be performed for live streaming of content, such as live events, live television programs, live audio programs, etc. Using the method of FIG. 3, each of a plurality of wireless sites within a particular geographic area will include a substantially similar set of media. This media can be any type of media, including, but not limited to, video, audio, etc. The set of media can be, for example, the entire set of media for Apple, Inc.'s iTunes®, a television network, etc. In the case of Apple, Inc.'s iTunes® the set of media can include a plurality of individual media, such as songs, videos (e.g., music videos, television shows, and movies), applications ("apps"), books, and the like. In the case of a television network the set of media can include a plurality of individual media, such as television programs, movies and related content. Moreover, the entire set of media can be media from a number of content providers, such as a number of television networks, movie studios and/or content providers such as Apple, Inc.'s iTunes®

The transmission from content providers 101a-101g and/or content aggregators 103a, 103b to satellite 250 and the transmissions from satellite 250 to wireless sites 209a, 209b can employ File Broadcast Protocol (FBP) to detect errors in file transmissions and Backhaul Messaging Protocol (BMP) can be used to request retransmission of missed/erroneous packets via 112 terrestrial network through network gateway 115 from the terrestrial gateway (TGW) 205.

Figure 4:
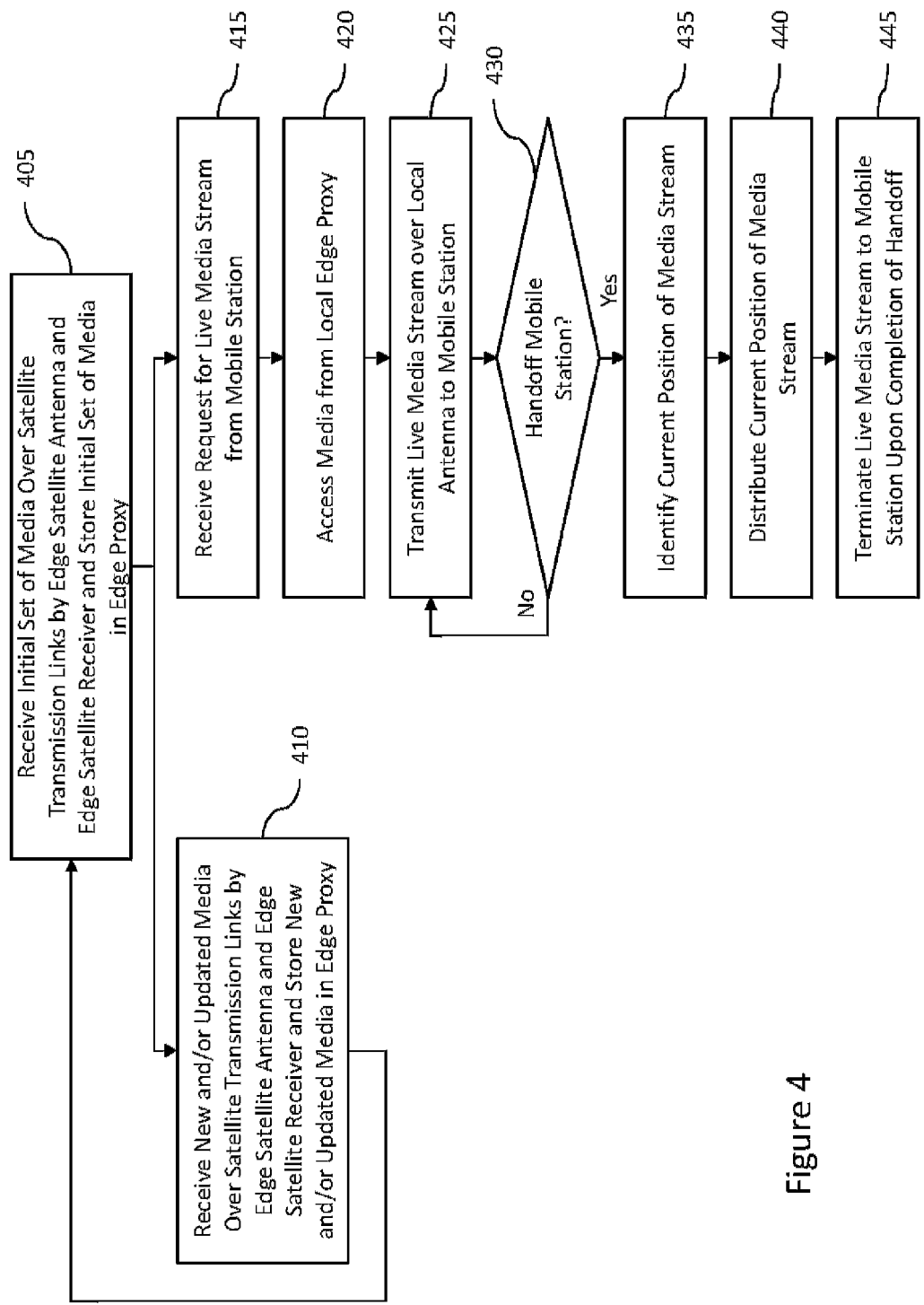
FIG. 4 is a flow chart illustrating an exemplary method in accordance with the present invention.

FIG. 4 is a flow chart of a method for a wireless site 209a, 209b in accordance with exemplary embodiments of the present invention. Initially, a wireless site 209a, 209b receives an initial set of media over satellite transmission links from one or more satellites 250 (step 405). Specifically, the initial set of media is received by satellite antenna 208a, 208b, passed to edge proxy receiver 206a, 206b, and then stored in edge proxy server 207a, 207b. New and/or updated media can be received from one or more satellites 250 and stored in the same manner as discussed above (step 410). Again, the set of media, new media and updated media is received independent of a local request from a mobile station supported by the wireless site.

When wireless site 209a, 209b receives a request for a live media stream from a mobile station 111 (step 415), wireless node 212a, 212b accesses the stored content from the local storage of edge proxy server 207a, 207b (step 420) and then transmits the live media stream over local antenna 210a to the mobile station 111 (step 425). If necessary, edge proxy server 207a, 207b can transcode, transrate and/or convert the format of the media to accommodate a media player in the mobile station. This can be performed using, for example, information in the request for the media stream received from the mobile station.

It will be recognized that wireless sites 209a, 209b have a limited transmission range, and accordingly if mobile station 111 moves towards the outer reaches of the transmission range it will be necessary to handoff the mobile station to another wireless site. Thus, for example, mobile station 111 may initially receive a live media stream from wireless site 209a and when it moves towards wireless site 209b the mobile station will be handed-off to wireless site 209b. Accordingly, wireless site 209a will continue to transmit the live media stream to mobile station 111 (step 425) as long as a hand-off is not required ("No" path out of decision step 430). When, however, hand-off is required ("Yes" path out of decision step 430), then wireless site 209a determines the current position of the media stream (step 435), distributes the current position (step 440) and terminates transmission of the live media stream upon completion of the handoff (step 445). The wireless site can inform the content provider and/or content aggregator of the use of the content when the content is initially transmitted to the mobile station and/or upon termination of the transmission so that the user of the mobile station can be charged for accessing the content. This can be achieved using Backhaul Messaging Protocol (BMP) to communicate with content providers 101a-101g using proxy messaging, file reception and playout confirmation messages as required for proof of delivery and billing applications.

The method illustrated in FIG. 4 can be performed using instructions stored on a non-transitory computer-readable medium. Thus, for example, the edge proxy server can include a processor that executes the instructions stored on the non-transitory computer-readable medium to perform some or all of the steps in FIG. 4. Alternatively, the edge proxy server can include an application specific integrated circuit (ASIC) and/or a field programmable gate array (FPGA) to perform some or all of the steps in FIG. 4.

Exemplary embodiments of the present invention are not limited in the manner in which handoff occurs. Thus, for example, the present invention can employ mobile station-initiated handoff, base station-initiated handoff, infrastructure-initiated handoff or any combination of thereof. Accordingly, the handoff determination can be based on receipt of a handoff indication from the mobile station, another wireless site and/or the wireless network infrastructure. Additionally, the handoff can be a hard handoff (i.e., a break-before-make handoff) in which the mobile station only receives a media stream from one wireless site at a time, a soft handoff (i.e., a make-before-break handoff) in which the mobile station will receive the media stream from more than one wireless site during the handoff process or any variation of these types of handoffs. File downloads can be provided using a point-to-point unicast connection with the mobile station, whereas live streams can be provided using a point-to-point with the mobile station or a point-to-multipoint connection with mobile stations capable of implementing an IGMP join to a multicast group on multicast capable router.

Exemplary embodiments of the present invention are also not limited in the manner in which the current position of the media stream is identified and distributed. The current position can be identified based on packet sequence numbers/indicators. Additionally, the current position can be distributed directly to the wireless site to which the mobile station is handing-over via the air interface, can be distributed first to the mobile station which then transmits it to the wireless site to which the mobile station is handing-over and/or can be distributed via the wireless network infrastructure to the wireless site to which the mobile station is handing-over.

By employing the broadcasting and/or multicasting of the media from the satellite in combination with local storage in a proxy server of the media at the wireless sites, exemplary embodiments of the present invention reduce costs and improve customer performance on mobile networks compared to providing the media through the terrestrial network to the wireless sites.

Although not described in detail above, it will be recognized that the system of the present invention provides error recovery, quality control, content security, digital rights management and billing functions. The content security, digital rights management and billing functions can employ the terrestrial network. Additionally, an edge receiver can record live content for supplemental use or time delay to accommodate different time zones and for time shifting. In this case, the recorded content is reported back to the content provider responsible for the live broadcast and the recorded content can be included in a program guide provided to the mobile stations.

It will be recognized that although exemplary embodiments have been described in connection with a particular number of content providers, content gateways, satellite gateways, satellites and wireless sites, the present invention is not limited to the particular number described. Thus, for example, it will be recognized that there can be more than two wireless sites, and in some cases hundreds of thousands of wireless sites spread across a large geographic area.

The above Detailed Description of embodiments of the system is not intended to be exhaustive or to limit the system to precise form disclosed above. While specific embodiments of, and examples for, the system are described above for illustrative purposes, various equivalent modifications are possible within the scope of the system, as those skilled in relevant art will recognize. For example, while method steps or elements are presented in a given order, alternative embodiments may perform the same or similar functions or employ systems having elements in a different order and some steps or elements may be deleted or moved, added or subdivided, combined or modified to provide alternative combinations or subcombinations. Each of these functions or elements may be implemented in a variety of ways.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:
   receiving, by a plurality of wireless sites connected to a terrestrial network, a substantially similar set of media that includes a plurality of individual media independent of a local user request for any of the plurality of individual media in the set of media, wherein each of the wireless sites includes a satellite antenna and satellite receiver via which the set of media is received from a broadcast transmission from a satellite;
   detecting for the presence of one or more errors in the set of media received from the broadcast transmission from the satellite;

storing, by each of the wireless sites, the set of media, wherein each of the wireless sites stores the set of media in a local edge proxy server of the wireless site;

receiving, by one of the plurality of the wireless sites, a request for a live stream of media from a mobile station;

accessing, by the one of the plurality of wireless sites, the requested media from the set of media stored in the local edge proxy server;

transmitting, by one of the plurality of wireless sites, the live stream of media to the mobile station;

receiving, by the one of the plurality of wireless sites, a handoff indication of the mobile station;

identifying, by the one of the plurality of wireless sites, a current position of the live media stream;

transferring, by the one of the plurality of wireless sites, an indication of the current position of the live media stream, wherein the transferring of the indication of the current position of the live media stream is performed by distributing, by the one of the plurality of wireless sites, the indication of the current position of the live media stream to the mobile station, and transmitting, by the mobile station to another of the plurality of wireless sites, the distributed indication of the current position of the live media stream;

terminating, by the one of the plurality of wireless sites, transmission of the live media stream to the mobile station; and supporting, by the one of the plurality of wireless sites, voice communications between the mobile station and a wireless network provider's core network via the terrestrial network connected to the one of the plurality of wireless sites.

2. The method of claim 1, wherein after the indication of the current position of the live media stream is transferred, the mobile station receives the live media stream from the one of the plurality of wireless sites and another of the plurality of wireless sites until the mobile station hands-off to the another of the plurality of wireless sites.

3. The method of claim 1, wherein the indication of the current position of the live media stream is a packet sequence number/indicator.

4. The method of claim 1, wherein the wireless site transmits communications in a local area network.

5. The method of claim 1, wherein the wireless site transmits communications in a wide area network.

6. The method of claim 1, wherein based on said detecting for the presence of one or more errors in the received set of media, requesting, via the terrestrial network, retransmission of at least a portion of the received set of media.

7. The method of claim 1, wherein said detecting for the presence of one or more errors is performed using File Broadcast Protocol.

8. The method of claim 6, wherein said requesting of retransmission is performed using Backhaul Messaging Protocol.

9. The method of claim 1, wherein the handoff indication is received from the mobile station.

10. The method of claim 1, wherein the handoff indication is received from a wireless network infrastructure.

11. The method of claim 10, wherein the handoff indication is provided to the wireless network infrastructure from another of the plurality of wireless sites.

12. An apparatus comprising:
a satellite antenna;
a satellite receiver coupled to the satellite antenna; and
a local edge proxy server coupled to the satellite receiver, a terrestrial network and to a wireless node, wherein the local edge proxy server includes a processor and memory, the memory storing a set of media, which includes a plurality of individual media, received via the satellite antenna and the satellite receiver from a broadcast transmission from a satellite, wherein the local edge proxy server stores the set of media independent of a local user request for any of the plurality of individual media in the set of media, provides a live media stream from the set of media to a mobile station, and determines a current position of the live media stream in response to a handoff indication and transfers an indication of the current position of the live media stream, wherein the transferring of the indication of the current position of the live media stream is performed by distributing the indication of the current position of the live media stream to the mobile station, and transmitting, by the mobile station, the distributed indication of the current position of the live media stream;

wherein the local edge proxy server is located at a wireless site of the wireless node, and wherein the wireless node supports voice communications between the mobile station and a wireless network provider's core network via the terrestrial network; and further wherein the local edge proxy server detects for the presence of one or more errors in the set of media received from the broadcast transmission from the satellite.

13. The apparatus of claim 12, wherein the local edge proxy server requests, via the terrestrial network, retransmission of at least a portion of the received set of media based on the detection for the presence of one or more errors in the received set of media.

14. The apparatus of claim 12, wherein said detection for the presence of one or more errors is performed using File Broadcast Protocol.

15. The apparatus of claim 13, wherein the local edge proxy server requests retransmission using Backhaul Messaging Protocol.

16. A non-transitory computer-readable medium storing instructions, which when executed, cause equipment at a wireless site to:

receive a set of media that includes a plurality of individual media independent of a local user request for any of the plurality of individual media in the set of media, wherein the wireless site includes a satellite antenna and satellite receiver via which the set of media is received from a broadcast transmission from a satellite;

detect for the presence of one or more errors in the set of media received from the broadcast transmission from the satellite;

store the set of media;

receive a request for a live stream of media from a mobile station;

access the requested media from the set of media stored in the local edge proxy server;

transmit the live stream of media to the mobile station;

receive a handoff indication for the mobile station;

identify a current position of the live media stream;

transfer an indication of the current position of the live media stream, wherein the transferring of the indication of the current position of the live media stream is performed by distributing, by the wireless site, the indication of the current position of the live media stream to the mobile station, and transmitting, by the mobile station to another wireless site, the distributed indication of the current position of the live media stream;

terminate transmission of the live media stream to the mobile station; and support voice communications between the mobile station and a wireless network provider's core network via a terrestrial network connected to said wireless site.

17. The non-transitory computer-readable medium of claim 16, wherein the wireless site and the another wireless site each store a substantially similar set of media.

18. The non-transitory computer-readable medium of claim 16, wherein after the indication of the current position of the live media stream is transferred, the mobile station receives the live media stream from the wireless site and another wireless site until the mobile station hands-off to the another wireless site.

* * * * *